United States Patent
Benson

(10) Patent No.: US 10,427,510 B2
(45) Date of Patent: Oct. 1, 2019

(54) GLASS RUN SEALING MEMBERS INCLUDING HINGED SEALING PROJECTION STRUCTURES FOR VEHICLES

(71) Applicant: TOYOTA MOTOR ENGINEERING & MANUFACTURING NORTH AMERICA, INC., Erlanger, KY (US)

(72) Inventor: Blaine C. Benson, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 99 days.

(21) Appl. No.: 15/428,548

(22) Filed: Feb. 9, 2017

(65) Prior Publication Data

US 2018/0222302 A1    Aug. 9, 2018

(51) Int. Cl.
| | | |
|---|---|---|
| *B60J 10/76* | (2016.01) | |
| *B60J 10/18* | (2016.01) | |
| *B60J 10/70* | (2016.01) | |
| *B60J 10/16* | (2016.01) | |

(52) U.S. Cl.
CPC .............. *B60J 10/76* (2016.02); *B60J 10/16* (2016.02); *B60J 10/18* (2016.02); *B60J 10/70* (2016.02)

(58) Field of Classification Search
CPC .................................. B60J 10/76; B60J 10/18
See application file for complete search history.

(56) References Cited

U.S. PATENT DOCUMENTS

| 4,047,751 | A | | 9/1977 | Koike et al. | |
|---|---|---|---|---|---|
| 4,060,272 | A | * | 11/1977 | Mori | B60J 10/246 296/93 |
| 4,107,898 | A | * | 8/1978 | Andrzejewski | B60J 10/18 428/122 |
| 4,455,785 | A | * | 6/1984 | Wahr | B60J 10/248 49/498.1 |

(Continued)

FOREIGN PATENT DOCUMENTS

| DE | 19845422 A1 | | 4/2000 | |
|---|---|---|---|---|
| DE | 102005060976 A1 | * | 6/2007 | B60J 10/24 |

(Continued)

*Primary Examiner* — Catherine A Kelly
(74) *Attorney, Agent, or Firm* — Dinsmore & Shohl LLP

(57) ABSTRACT

A vehicle includes a vehicle door including a door body portion, a door frame portion and a door window that is retractable from the door frame portion and extendable into the door frame portion. The door frame portion includes an upper portion including a glass run channel that receives an upper edge of the door window with the door window in a closed configuration. A glass run sealing member is located in the glass run channel. The glass run sealing member includes an exterior side including an interior face that faces toward the glass run channel. The glass run sealing member includes a hinged sealing projection structure including an inboard sealing member that extends from the interior face into the glass run channel and an inboard sealing sub-member connected to the inboard sealing member. The inboard sealing sub-member rotates into contact with an exterior side of the door window as the inboard sealing member moves with an upper edge of the door window as the door window enters the glass run channel.

20 Claims, 4 Drawing Sheets

(56) References Cited

U.S. PATENT DOCUMENTS

| | | | | |
|---|---|---|---|---|
| 4,472,469 A * | 9/1984 | Thies | ............... | B60J 10/16 |
| | | | | 428/122 |
| 4,653,802 A | 3/1987 | Watanabe et al. | | |
| 4,969,295 A | 11/1990 | Nishikawa et al. | | |
| 5,016,394 A * | 5/1991 | Iida | ............... | B60J 10/24 |
| | | | | 49/441 |
| 5,209,019 A * | 5/1993 | Morita | ............... | B60J 10/248 |
| | | | | 49/475.1 |
| 5,317,835 A * | 6/1994 | Dupuy | ............... | B60J 10/235 |
| | | | | 49/377 |
| 5,732,509 A * | 3/1998 | Buehler | ............... | B60J 10/79 |
| | | | | 49/440 |
| 6,442,902 B1 * | 9/2002 | Van Den Oord | ...... | B60J 10/248 |
| | | | | 49/498.1 |
| 6,792,718 B2 * | 9/2004 | Nozaki | ............... | B60J 10/18 |
| | | | | 49/441 |
| 8,302,350 B2 * | 11/2012 | Lee | ............... | B60J 10/87 |
| | | | | 49/440 |
| 8,595,982 B2 * | 12/2013 | Matsuura | ............... | E06B 3/42 |
| | | | | 49/441 |
| 8,689,489 B2 * | 4/2014 | Mine | ............... | B60J 10/76 |
| | | | | 49/441 |
| 8,764,099 B2 * | 7/2014 | Suzuki | ............... | B62D 25/04 |
| | | | | 296/146.2 |
| 8,869,456 B2 * | 10/2014 | Matsuura | ............... | E06B 7/22 |
| | | | | 49/489.1 |
| 9,079,481 B2 * | 7/2015 | Nameki | ............... | B29C 47/003 |
| 9,475,374 B2 * | 10/2016 | Murree | ............... | B29D 99/0053 |
| 9,718,337 B2 * | 8/2017 | Stephan | ............... | B60J 10/76 |
| 9,783,134 B2 * | 10/2017 | Mori | ............... | B60R 13/04 |
| 2007/0006534 A1 * | 1/2007 | Hiramatsu | ............... | B60J 10/21 |
| | | | | 49/414 |
| 2007/0271853 A1 * | 11/2007 | Yatsuda | ............... | B60J 10/74 |
| | | | | 49/489.1 |
| 2008/0178531 A1 | 7/2008 | Takeuchi et al. | | |
| 2016/0059684 A1 * | 3/2016 | Nam | ............... | B60J 10/088 |
| | | | | 49/483.1 |
| 2017/0225553 A1 * | 8/2017 | Masumoto | ............... | B60J 10/76 |

FOREIGN PATENT DOCUMENTS

| | | | | |
|---|---|---|---|---|
| DE | 102012108587 A1 * | 3/2014 | ............ | B60J 10/16 |
| JP | 2007131270 A * | 5/2007 | | |
| JP | 4364707 B2 | 11/2009 | | |
| JP | 5780215 B2 | 9/2015 | | |
| JP | 2016107681 A | 6/2016 | | |

* cited by examiner

GLASS RUN SEALING MEMBERS INCLUDING HINGED SEALING PROJECTION STRUCTURES FOR VEHICLES

TECHNICAL FIELD

The present specification generally relates to glass run structures for vehicles, and more specifically, glass run sealing members for glass run structures that include hinged sealing projection structures.

BACKGROUND

Vehicle doors typically include a door frame that encloses a door window. The door window can be retractable into the vehicle door to provide an open configuration and extendable out of the vehicle door to provide a closed configuration. When placed in the closed configuration, an upper edge of the door window may be received by a glass run channel of the door frame. A glass run sealing member may be located in the glass run channel that seals against the upper edge of the door window. Sealing the upper edge of the door window can reduce noise and inhibit water from entering the vehicle with the door window in the closed configuration.

Accordingly, a need exists for alternative glass run sealing members for glass run structures that seal against an upper edge of door windows.

SUMMARY

In one embodiment, a vehicle includes a vehicle door including a door body portion, a door frame portion and a door window that is retractable from the door frame portion and extendable into the door frame portion. The door frame portion includes an upper portion including a glass run channel that receives an upper edge of the door window with the door window in a closed configuration. A glass run sealing member is located in the glass run channel. The glass run sealing member includes an exterior side including an interior face that faces toward the glass run channel. The glass run sealing member includes a hinged sealing projection structure including an inboard sealing member that extends from the interior face into the glass run channel and an inboard sealing sub-member connected to the inboard sealing member. The inboard sealing sub-member rotates into contact with an exterior side of the door window as the inboard sealing member moves with an upper edge of the door window as the door window enters the glass run channel.

In another embodiment, a glass run sealing member for a glass run channel includes an exterior side including an interior face. The glass run sealing member comprising a hinged sealing projection structure including an inboard sealing member extending from the interior face and an inboard sealing sub-member connected to the inboard sealing member. The inboard sealing sub-member rotates into contact with an exterior side of a door window as the inboard sealing member moves with an upper edge of the door window as the door window enters the glass run channel. A reinforcement member is located within the inboard sealing member and the inboard sealing sub-member. The reinforcement member being formed of a material that is harder than a material forming the inboard sealing member and the inboard sealing sub-member.

In another embodiment, a method of sealing a door window using a glass run sealing member is provided. The method includes providing a glass run sealing member located in a glass run channel. The glass run sealing member includes an exterior side including an interior face that faces toward the glass run channel. The glass run sealing member includes a hinged sealing projection structure including an inboard sealing member extending from the interior face into the glass run channel and an inboard sealing sub-member connected to the inboard sealing member. The inboard sealing sub-member is rotated into contact with an exterior side of the door window as the inboard sealing member moves with an upper edge of the door window as the door window enters the glass run channel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a body framework structure including roof rail structures and vehicle door assemblies that engage the roof rail structures in closed configurations. The vehicle door assemblies include a door frame that is connected to a door body. A window regulator assembly may be located between inner and outer panels of the door body. The window regulator assembly may be used to extend and retract a door window toward and away from the door frame. The door frame includes a glass run channel located along an upper portion of the door frame. The glass run channel receives an upper edge of the door window with the door window in a closed configuration. A glass run sealing member is positioned within the glass run channel. The glass run sealing member runs along a length of the glass run channel and also receives the upper edge of the door window. The glass run sealing member includes a number of sealing projection structures that extend into the glass run channel to engage the upper edge of the door window as the door window enters the glass run channel. A hinged sealing projection structure is provided that includes an inboard sealing member that extends into the glass run channel to engage the upper edge of the door window when the door window enters the glass run channel and an inboard sealing sub-member connected to the first sealing portion at a pivot location, such that movement of the inboard sealing member against the upper edge of the door window as the upper edge enters the glass run channel pivots the inboard sealing sub-member into engagement with the door window at a location below the inboard sealing member. A reinforcement insert may extend between the inboard sealing member and the inboard sealing sub-member to provide increased rigidity at the pivot location to facilitate pivoting of the inboard sealing sub-member in response to movement of the inboard sealing member.

Figure 1:
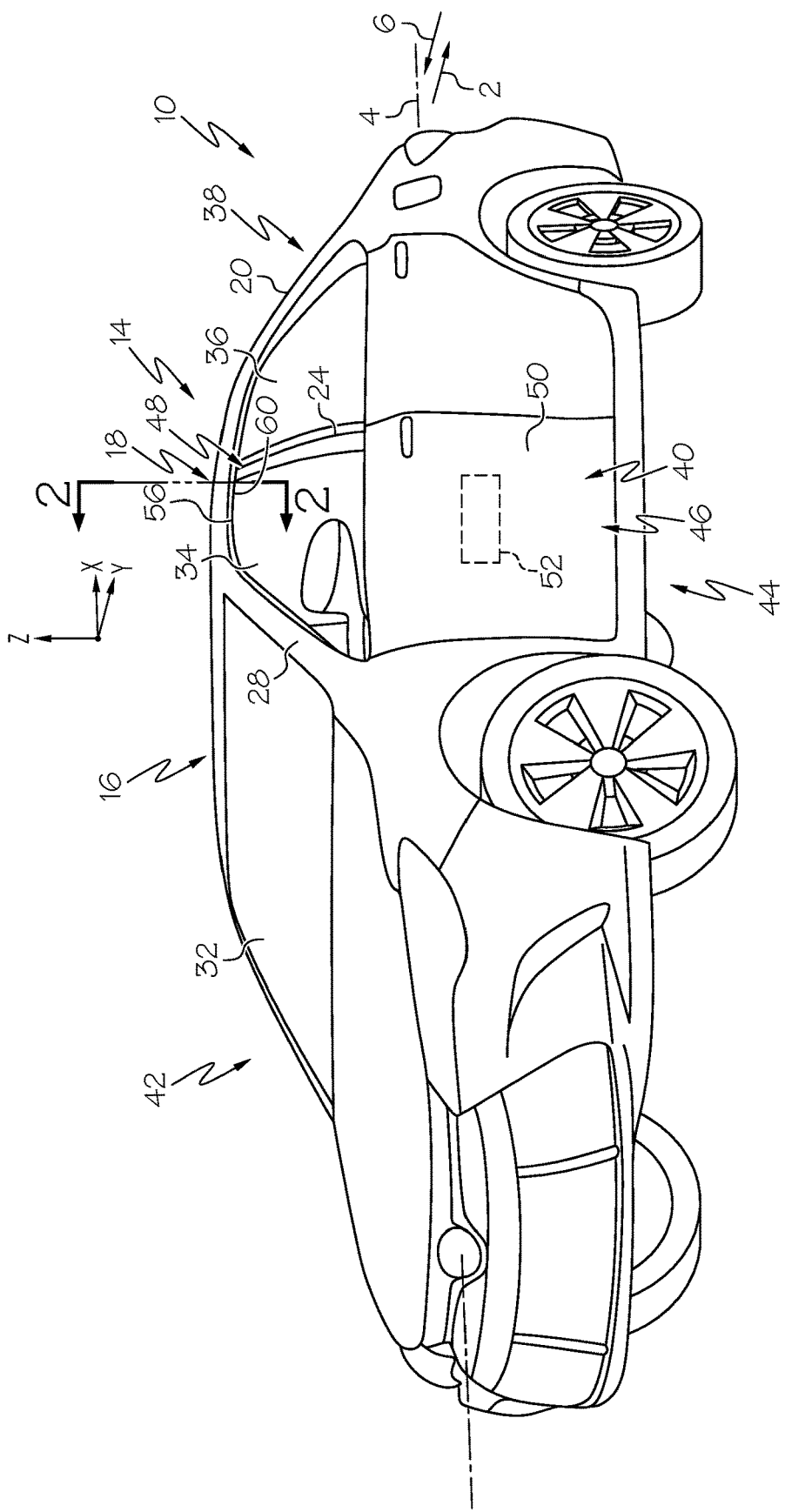
FIG. 1 schematically depicts a perspective view of a vehicle according to one or more embodiments shown or described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 includes a vehicle body 12 including a body framework 14 that includes a pair of side roof rail structures 16 and 18 and various pillars. The various pillars are connected to the side roof rail structures 16 and 18 and extend downwardly therefrom in a vehicle vertical direction. These pillars are generally referred to as the C-pillars 20, the B-pillars 24 and the A-pillars 28. The A-pillars 28 are located toward the forward end of the vehicle 10, generally between a front windshield 32 and front side windows 34. The B-pillars 24 are located generally between the front and rear side door windows 34 and 36 of the vehicle 10. Finally, the C-pillars 20 are located between the rear side window 36 and rear window 38 of the vehicle. Other pillars, such as D-pillars may be located rearward of the C-pillars 20 (e.g., between rear side windows and rear window).

Motor vehicles that incorporate elements according to the present disclosure may include a variety of construction methodologies that are conventionally known, including a unibody construction methodology as well as a body-on-frame construction methodology. Furthermore, the Figures may only show one side of the vehicle. Descriptions of the other side of the vehicle may be omitted because both sides of the vehicle may be laterally symmetrical and substantially the same.

Vehicle doors 40 are provided at each side 42 and 44 of the vehicle 10. The vehicle doors 40 include a door body portion 46 and a door frame portion 48 that extends from the door body portion 46 in the vehicle vertical direction. The door body portion 46 and the door frame portion 48 may be formed of inner and outer panels, however, only outer panel 50 can be seen. Between the inner and outer panels 50, a window regulator assembly, generally referred to as element 52, may be provided. The window regulator assembly 52 may be connected to a lower edge of the door window 34. The window regulator assembly 52 may be motor-driven to move the door window 34 between closed and open configurations. In other embodiments, the door window 34 may be moved by other mechanisms, such as manually.

Figure 2:
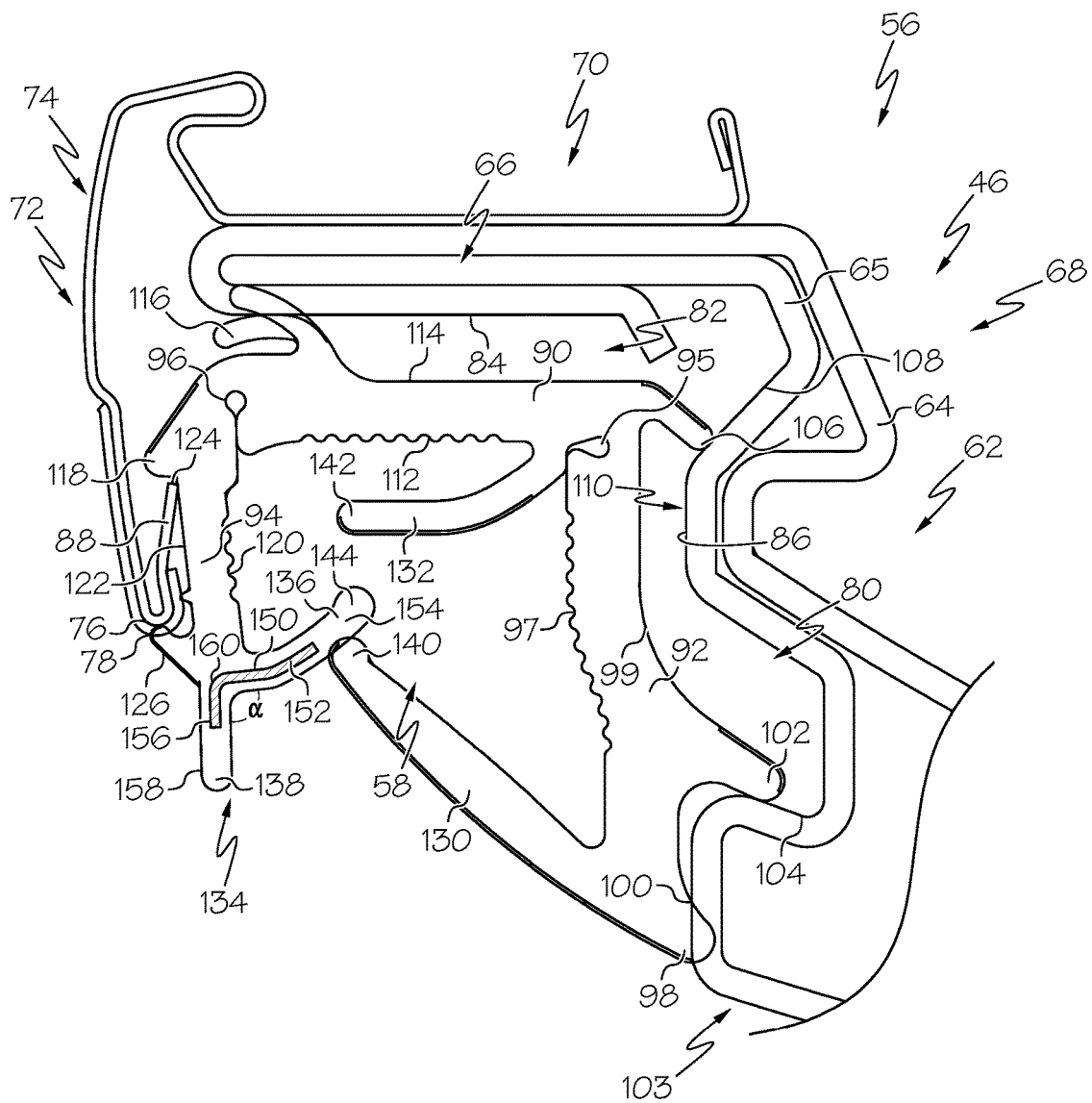
FIG. 2 illustrates a diagrammatic section view of a glass run channel for the vehicle of FIG. 1 with a glass run sealing member in an original configuration according to one or more embodiments shown or described herein.

The door frame portion 48 includes an upper portion 56 that provides a glass run channel 58 that can receive an upper edge 60 of the door window 34. FIG. 2 illustrates a section view of the upper portion 56 of the door frame portion 48. The door frame portion 48 may be formed as a channel member 62 that includes an interior panel portion 64 and an exterior panel portion 65 that are joined together at joint 66. The door frame portion 48 may include a vertical portion 68 that extends generally in the vehicle vertical direction and a horizontal portion 70 that extends in the vehicle lateral direction thereby forming the glass run channel 58. A door molding 72 may also be provided that forms part of the glass run channel 58. The door molding 72 may be connected to the door frame portion 48 at the joint 66 and extend downwardly from the joint 66 at a sash portion 74. The sash portion 74 may have, for example, a chrome exterior or other aesthetic appearance. The door molding 72 may extend downwardly to bend 76 forming a lower exterior edge 78 of the glass run channel 58.

A glass run sealing member 80 may be located in the glass run channel 58. The glass run sealing member 80 may include a sealing member body 82 that extends along an upper portion 84, an interior side portion 86 and an exterior side portion 88 of the glass run channel 58. The sealing member body 82 may include an upper side 90, an interior side 92 and an exterior side 94. The exterior side 94 may be connected to the upper side 90 by an exterior fold 96 and the interior side 92 may be connected to the upper side 90 by an interior fold 95. In some embodiments, the upper side 90, interior side 92 and exterior side 94 may all be all integrally formed together as part of the sealing member body 82. In other embodiments, one or more of the upper side 90, interior side 92 and exterior side 94 may be formed separately and connected to the others of the upper side 90, interior side 92 and exterior side 94.

The glass run sealing member 80 includes a number of anchor members to anchor the glass run sealing member 80 within the glass run channel 58. In the embodiment of FIG. 2, the glass run sealing member 80 includes the interior side 92 that includes an exterior face 97 facing toward the glass run channel 58 and an interior face 99 facing away from the glass run channel 58. A lower interior anchor member 98 extends laterally outwardly from the interior face 99 to engage an exterior face 100 of a lower abutment structure 103 that is formed by the exterior panel portion 65 of the channel member 62. Another lower interior anchor member 102 extends laterally outwardly from the interior face 99 at a location spaced vertically from the lower interior anchor member 102 to engage an upper face 104 of the lower abutment structure 103 thereby anchoring a lower portion of the interior side 92 against the lower abutment structure 103. An upper interior anchor member 106 extends laterally from the interior face 99 at a location spaced vertically from both the lower interior anchor members 98 and 102 to engage an upper face 108 of an upper abutment structure 110.

The upper side 90 may include a lower face 112 facing toward the glass run channel 58 and an upper face 114 facing away from the glass run channel 58. An upper exterior anchor member 116 extends vertically from the upper face 114 toward the joint 66 where the interior panel portion 64 and the exterior panel portion 65 are joined together. The upper exterior anchor member 116 anchors the upper side 90 against the exterior panel portion 65 at the joint 66.

The glass run sealing member 80 includes the exterior side 94 that includes an interior face 120 facing toward the glass run channel 58 and an exterior face 122 facing away from the glass run channel 58. An upper exterior anchor member 118 extends laterally outwardly from the exterior face 122 to engage a terminating end 124 of the door molding 72. A lower exterior anchor member 126 extends laterally outwardly from the exterior face 122 to engage the bend 76 of the door molding 72. The upper exterior anchor member 118 and lower exterior anchor member 126 anchors the exterior side 94 against the door molding 72.

The glass run sealing member 80 further includes a number of sealing projection structures that extend into the glass run channel 58. In the example of FIG. 2, the glass run sealing member 80 includes the interior side 92 that includes a lower sealing projection structure 130. The lower sealing projection structure 130 extends laterally outwardly from the exterior face 97 of the interior side 92 of the glass run sealing member 80. In some embodiments, the lower sealing projection structure 130 extends laterally outwardly opposite from the lower interior anchor member 98. The glass run sealing member 80 further includes the upper side 90 that includes an upper sealing projection structure 132 that extends laterally outwardly from the lower face 112 of the upper side 90 of the glass run sealing member 80. In some embodiments, the upper sealing projection structure 132 extends laterally outwardly opposite from the upper interior anchor member 106.

The glass run sealing member 80 further includes the exterior side 94 that includes a hinged sealing projection structure 134. The hinged sealing projection structure 134 includes an inboard sealing member 136 and an inboard sealing sub-member 138. The inboard sealing member 136 extends laterally outwardly from the interior face 120 of the exterior side 90, while the inboard sealing sub-member 138 extends vertically downwardly from the inboard sealing member 136. In some embodiments, the hinged sealing projection structure 134 extends laterally opposite from the lower exterior anchor member 126.

The lower sealing projection structure 130, the upper sealing projection structure 132 and the inboard sealing member 136 of the hinged sealing projection structure 134 include ends 140, 142 and 144 that are positioned within the glass run channel 58 to engage the upper edge 60 of the door window 34 (FIG. 1) as the upper edge 60 enters the glass run channel 58. As will be described in greater detail below, as the upper edge 60 of the door window 34 enters the glass run channel 58, the upper edge 60 engages the ends 140, 142 and 144 and deflects the lower sealing projection structure 130, the upper sealing projection structure 132 and the inboard sealing member 136 upward in the vehicle vertical direction. The deflection of the inboard sealing member 136 causes the hinged sealing projection structure 134 to rotate to also bring the inboard sealing sub-member 138 into contact with an exterior surface of the door window 34.

Referring still to FIG. 2, the hinged sealing projection structure 134 includes the inboard sealing member 136 which may be integrally formed with the inboard sealing sub-member 138. As can be seen, the inboard sealing member 136 extends outwardly into the glass run channel 58, while the inboard sealing sub-member 138 extends downwardly away from the glass run channel 58 in the vehicle vertical direction at an angle α from the inboard sealing member 136 forming a somewhat L-shaped hinged sealing projection structure. Embedded within the hinged sealing projection structure 134 is a reinforcement member 150. The reinforcement member 150 includes a first portion 152 that extends along an interior 154 of the inboard sealing member 136 and a second portion 156 that extends along an interior 158 of the inboard sealing sub-member 138. In the illustrated embodiment, the first portion 152 of the reinforcement member 150 is connected to the second portion 156 by a bend 160 forming a single integral reinforcement member 150. In other embodiments, the first portion 152 and the second portion 156 may be separately formed. The reinforcement member 150 may be formed of a material, such as a metal, that is harder than material forming the hinged sealing projection structure 134, such as rubber or plastic. As used herein, "hardness" refers to resistance of a material to plastic deformation.

As shown by FIG. 2, the hinged sealing projection structure 134 along with the other sealing projection structures 130 and 132 are illustrated in their relaxed, original configurations where no door window is located within the glass run channel 58. In this original configuration, the inboard sealing member 136 and the first portion 152 of the reinforcement member 150 extend into the glass run channel 58 and intersect a window pathway so that the upper edge 60 of the door window 34 can contact the inboard sealing member 136 at a location where the first portion 152 of the reinforcement member 150 is present.

Figure 3:
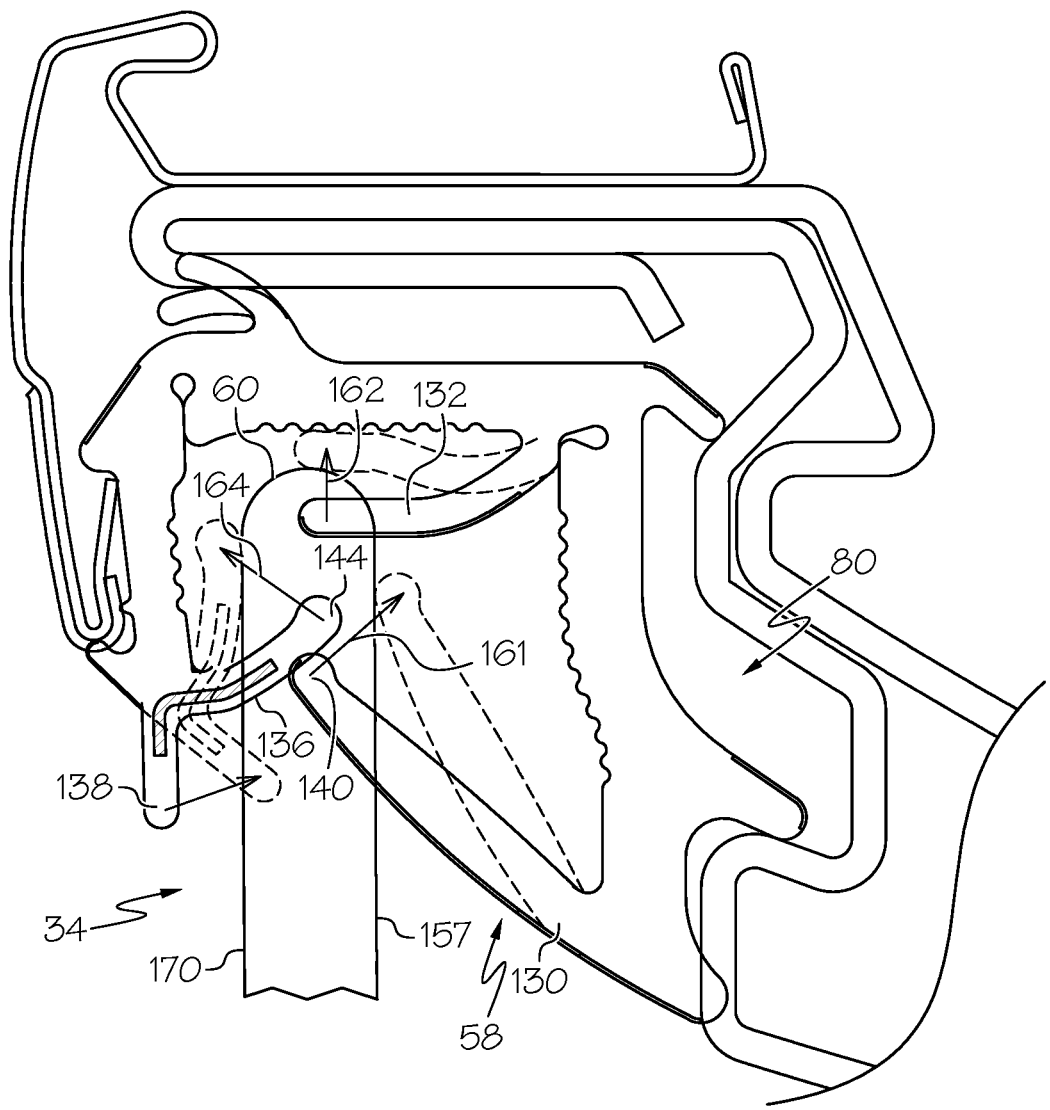
FIG. 3 illustrates the glass run sealing member of FIG. 2 with an upper edge of a door window entering the glass run channel according to one or more embodiments shown or described herein.

FIG. 3 illustrates the door window 34 passing into the glass run channel 58. As can be seen, the lower sealing projection structure 130, the upper sealing projection structure 132 and the inboard sealing member 136 of the hinged sealing projection structure 134 each engage the upper edge 60 of the door window 34 as the upper edge 60 passes into the glass run channel 58. In particular, the end 140 of the lower sealing projection structure 130 engages the upper edge 60 of the door window 34. Movement of the upper edge 60 of the door window 34 into the glass run channel 58 causes the lower sealing projection structure 130 to deflect inboard in a direction of arrow 161 due to the flexible material from which the lower sealing projection structure 130 is formed. Because the lower sealing projection structure 130 is also resilient, this resiliency biases the lower sealing projection structure 130 against an interior surface 157 of the door window 34. Movement of the upper edge 60 of the door window 34 into the glass run channel 58 also causes the upper sealing projection structure 132 to deflect upward in a direction of arrow 162 due to the flexible material from which the upper sealing projection structure 132 is formed. Because the upper sealing projection structure 132 is also resilient, this resiliency biases the upper sealing projection structure 132 against the upper edge 60 of the door window 34.

The upper edge 60 of the door window 34 also engages the end 144 of the inboard sealing member 136. This causes the inboard sealing member 136 to deflect outboard in the direction of arrow 164 due to the flexible material from which the hinged sealing projection structure 134 is formed. As can be seen, both the inboard sealing member 136 and the first portion 152 of the reinforcement member 150 intersect the window pathway such that the upper edge 60 of the door window 34 engages the inboard sealing member 136 at a location where the first portion 152 of the reinforcement member 150 is present. As the inboard sealing member 136 deflects, the inboard sealing sub-member 138 pivots in the direction of arrow 168 along with the second portion 156 of the reinforcement member 150. The lengths of the inboard sealing member 136 and the inboard sealing sub-member 138 are selected such that the inboard sealing sub-member 138 engages an exterior surface 170 of the door window 34 with the door window 34 fully inserted into the glass run channel 58.

Figure 4:
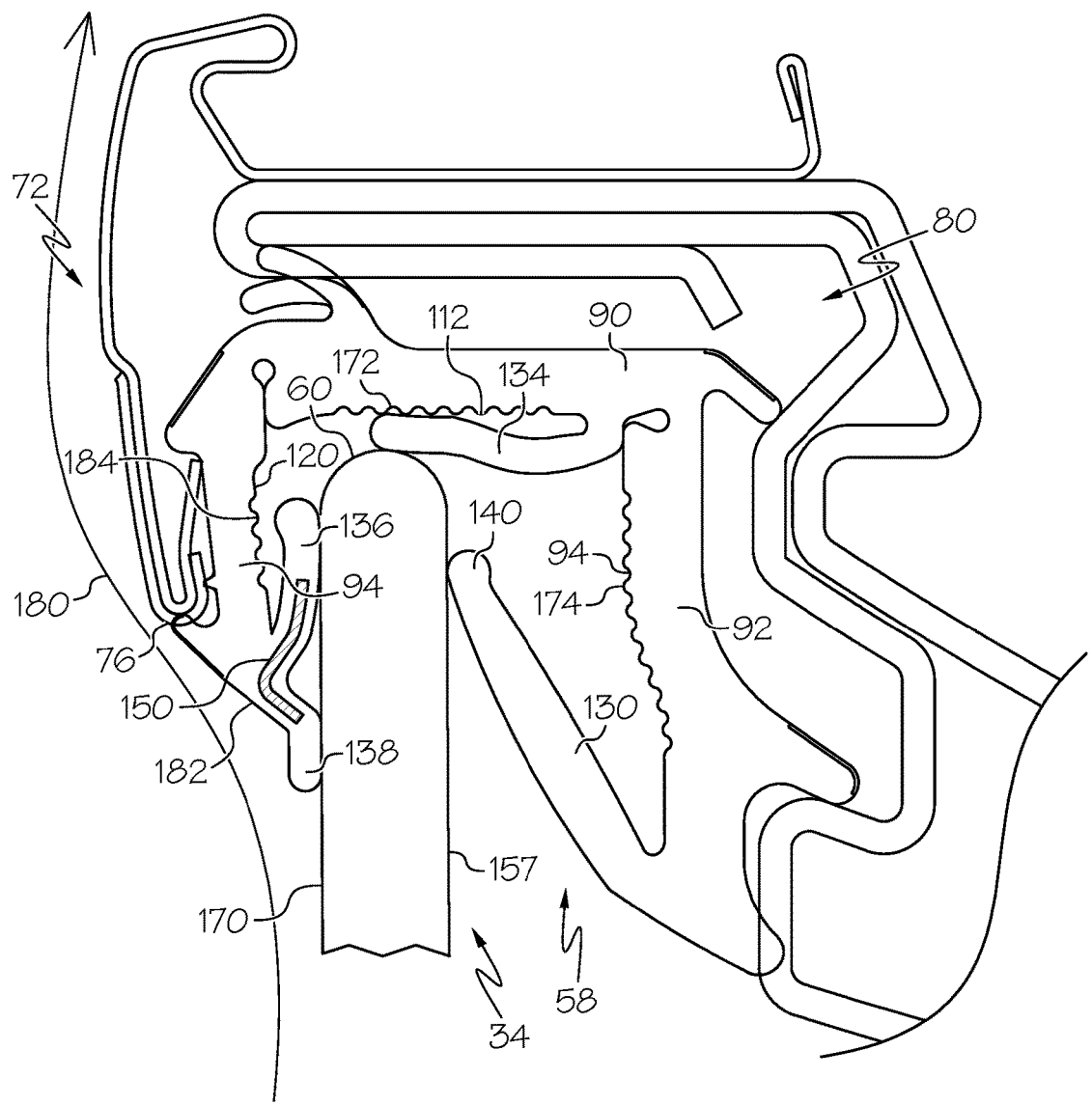
FIG. 4 illustrates the glass run sealing member of FIG. 2 with a door window in a closed configuration.

Referring to FIG. 4, the glass run sealing member 80 is illustrated with the upper edge 60 of the door window 34 fully inserted into the glass run channel 58. In this position, the upper edge 60 of the door window 34 pins the upper sealing projection structure 132 against the lower face 112 of the upper side 90 of the glass run sealing member 80. In some embodiments, the lower face 112 may be provided with undulations 172 or other surface features that can lower the contact surfaces between the upper sealing projection structure 132 and the lower face 112, which can inhibit adhesion between the two when in contact so that the upper sealing projection structure 132 can spring back to the original configuration. The lower sealing projection structure 130 is rotated to the illustrated position with the end 140 biased against the interior surface 157 of the door window 34. The exterior face 94 of the interior side 92 of the glass run sealing member 80 may also include undulations 174 or other surface features that can lower contact surfaces between the lower sealing projection structure 130 and the exterior face 94, which can inhibit adhesion between the two when in contact.

The hinged sealing projection structure 134 is pivoted due to the contact between the door window 34 and the inboard sealing member 136. The reinforcement member 150 facilitates rotation of the inboard sealing sub-member 138 also into contact with the exterior surface 170 of the door window 34. The interior face 120 of the exterior side 94 of the glass run sealing member 80 may also include undulations 184 or other surface features that can lower contact surfaces between the inboard sealing member 136 and the interior face 120. The end of the inboard sealing sub-member 138 may not include the reinforcement member 150 to allow the end to resiliently deflect when in contact with the exterior surface 170 of the door window 34. As represented by airflow line 180, the position of the inboard sealing sub-member 138 can provide for a more laminar airflow over the sash portion 74, which can reduce air noise and drag. An exterior surface 182 provides a ramp that extends between the exterior surface 170 of the door window 34 and the bend 76 of the door molding 72.

The above-described glass run sealing members with hinged sealing projection structures provide an inboard sealing member that extends into the glass run channel to engage the upper edge of the door window when the door window enters the glass run channel and an inboard sealing sub-member extending connected to the first sealing portion at a pivot location, such that movement of the inboard sealing member against the upper edge of the door window as the upper edge enters the glass run channel pivots the inboard sealing sub-member into engagement with the door window at a location below the inboard sealing member. A reinforcement insert may facilitate pivoting of the inboard sealing sub-member in response to movement of the inboard sealing member. The reinforcement insert may extend into both the inboard sealing member and the inboard sealing sub-member.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a vehicle door comprising a door body portion, a door frame portion and a door window that is retractable from the door frame portion and extendable into the door frame portion, the door frame portion comprising an upper portion comprising a glass run channel that receives an upper edge of the door window with the door window in a closed configuration; and
a glass run sealing member located in the glass run channel, the glass run sealing member including an exterior side including an interior face that faces toward the glass run channel, the glass run sealing member comprising a hinged sealing projection structure including an inboard sealing member extending from the interior face into the glass run channel and an inboard sealing sub-member connected to the inboard sealing member;
a reinforcement member that is located within the inboard sealing member and the inboard sealing sub-member;
wherein the inboard sealing sub-member rotates into contact with an exterior side of the door window as the inboard sealing member moves with an upper edge of the door window as the door window enters the glass run channel, the reinforcement member rotates with the inboard sealing member and the inboard sealing sub-member.

2. The vehicle of claim 1, wherein the door frame portion comprises a vertical portion and a horizontal portion that extends in a vehicle lateral direction forming at least part of the glass run channel.

3. The vehicle of claim 1, wherein the door frame portion comprises a door molding connected to the door frame portion, the door molding extending downwardly from the door frame portion to a bend that forms a lower edge of the glass run channel.

4. The vehicle of claim 3, wherein the glass run sealing member comprises a lower exterior anchor member that anchors the exterior side of the glass run sealing member to the bend of the door molding.

5. The vehicle of claim 3, wherein the inboard sealing sub-member has an exterior surface that forms a ramp that extends between the exterior surface of the door window and the bend with the inboard sealing sub-member in contact with the exterior surface of the door window.

6. The vehicle of claim 1, wherein the reinforcement member being formed of a material that is harder than a material forming the inboard sealing member and the inboard sealing sub-member.

7. The vehicle of claim 1, wherein the inboard sealing sub member extends downwardly from the inboard sealing member with the hinged sealing projection structure in an original configuration.

8. The vehicle of claim 1, wherein the glass run sealing member comprises:
an interior side that includes an exterior face facing toward the glass run channel; and
an upper side connected to the interior side that includes a lower face facing toward the glass run channel.

9. The vehicle of claim 8, wherein the interior side comprises a first sealing projection structure that extends outwardly from the exterior face into the glass run channel and the upper side includes a second sealing projection structure that extends outwardly from the lower face into the glass run channel.

10. A glass run sealing member for a glass run channel comprising:
    an exterior side including an interior face, the glass run sealing member comprising a hinged sealing projection structure including an inboard sealing member extending from the interior face and an inboard sealing sub-member connected to the inboard sealing member, the inboard sealing sub-member rotates into contact with an exterior side of a door window as the inboard sealing member moves with an upper edge of the door window as the door window enters the glass run channel; and
    a reinforcement member that is located within the inboard sealing member and the inboard sealing sub-member, the reinforcement member being formed of a material that is harder than a material forming the inboard sealing member and the inboard sealing sub-member, the reinforcement member rotates with the inboard sealing member and the inboard sealing sub-member.

11. The glass run sealing member of claim 10, wherein the glass run sealing member comprises a lower exterior anchor member that anchors the exterior side of the glass run sealing member.

12. The glass run sealing member of claim 10, wherein the inboard sealing sub-member has an exterior surface that forms a ramp that extends between the exterior surface of the door window and a door molding.

13. The glass run sealing member of claim 10, wherein the inboard sealing sub member extends outwardly from the inboard sealing member.

14. The glass run sealing member of claim 10 comprising:
    an interior side that includes an exterior face; and
    an upper side connected to the interior side that includes a lower face.

15. The glass run sealing member of claim 14, wherein the interior side comprises a first sealing projection structure that extends outwardly from the exterior face and the upper side includes a second sealing projection structure that extends outwardly from the lower face.

16. A method of sealing a door window using a glass run sealing member, the method comprising:
    providing a glass run sealing member located in a glass run channel, the glass run sealing member including an exterior side including an interior face that faces toward the glass run channel, the glass run sealing member comprising a hinged sealing projection structure including an inboard sealing member extending from the interior face into the glass run channel and an inboard sealing sub-member connected to the inboard sealing member; and
    rotating the inboard sealing sub-member into contact with an exterior side of the door window as the inboard sealing member moves with an upper edge of the door window as the door window enters the glass run channel;
    wherein a reinforcement member is located within the inboard sealing member and the inboard sealing sub-member, the reinforcement member rotating with the inboard sealing sub-member.

17. The method of claim 16, wherein the reinforcement member being formed of a material that is harder than a material forming the inboard sealing member and the inboard sealing sub-member.

18. The method of claim 16, wherein the inboard sealing sub member extends downwardly from the inboard sealing member with the hinged sealing projection structure in an original configuration.

19. The method of claim 16, wherein the glass run sealing member comprises:
    an interior side that includes an exterior face facing toward the glass run channel; and
    an upper side connected to the interior side that includes a lower face facing toward the glass run channel.

20. The method of claim 19, wherein the interior side comprises a first sealing projection structure that extends outwardly from the exterior face into the glass run channel and the upper side includes a second sealing projection structure that extends outwardly from the lower face into the glass run channel.

* * * * *